United States Patent Office 3,457,305
Patented July 22, 1969

---

3,457,305
PREPARATION OF ORGANOTHIOPHOSPHORUS HALIDES
Joseph W. Baker, Kirkwood, Leo C. D. Groenweghe, Olivette, and Raymond E. Stenseth, St. Louis, Mo., assignors to Monsanto Company, St. Louis, Mo., a corporation of Delaware
No Drawing. Filed Dec. 28, 1965, Ser. No. 517,091
Int. Cl. C07f 9/42, 9/20, 9/04
U.S. Cl. 260—543                        12 Claims

ABSTRACT OF THE DISCLOSURE

Process for the preparation of organophosphonothioic dihalides $[RP(S)X_2]$ and diorganophosphinothioic halides $[R_2P(S)X]$ which comprises reacting an organic sulfide $[R_2S]$ with a phosphorus trihalide $[PX_3]$ wherein R is hydrocarbyl of not more than 18 carbon atoms and X is halogen in the presence of a halide catalyst.

---

This invention relates to an improved process for the preparation of compounds of phosphorous and more particularly to an improved process for the preparation of organophosphonothioic dihalides and diorganophosphinothioic halides.

Organophosphonothioic dihalides and diorganophosphinothioic halides have been prepared heretofore by the process which comprises reacting an organic sulfide with a phosphorus trihalide in the liquid phase at a temperature from about 100° C. to 350° C. This process, which is disclosed and claimed in copending application Ser. No. 515,725, can be represented by the following non-stoichiometric expression

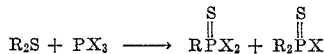

In accordance with the above represented reaction, the process results in the concomitant production of organophosphonothioic dihalides $[RP(S)X_2]$ and diorganophosphinothioic halides $[R_2P(S)X]$. When substantially equimolar amounts of reactants are employed, the organophosphonothioic dihalides generally comprise a major amount of the product phosphorus compounds and the diorganophosphinothioic halides a minor amount of the product phosphorus compounds. However, the ratio of diorganophosphinothioic halide to organophosphonothioic dihalide in the product phosphorus compounds can be increased by using an excess of organic sulfide reactant. In said process at temperatures below about 250° C., the yield is often uneconomical unless the reaction is carried out over a period of several days to several weeks. Furthermore, even at relatively high temperatures, e.g. above 275° C., organic sulfides only react very slowly with phosphorus trihalides and the yield over a reasonable reaction time is low. Severe liquid phase reaction temperatures, e.g. above 350° C., are not a solution since the organophosphonothioic dihalides and diorganophosphinothioic halides are sensitive to temperature and some decomposition occurs, thus reducing yield.

Accordingly, an object of this invention is to provide an improved liquid phase process for the preparation of organophosphonothioic dihalides and diorganophosphinothioic halides. Other objects will be apparent from a consideration of the following disclosure.

The above and other objects of this invention are accomplished by carrying out the process which comprises reacting an organic sulfide with a phosphorus trihalide in the presence of a halide catalyst. The use of halide catalyst in accordance with this invention materially accelerates the reaction rate, results in improved yield and allows the reaction to be carried out economically at substantially lower temperatures with shorter reaction periods than were heretofore possible. Moreover, the use of halide catalyst is advantageous since corrosion of reaction equipment is substantially reduced when the process is carried out at less severe temperatures.

In accordance with this invention phosphorus compounds selected from the group consisting of compounds represented by the formula

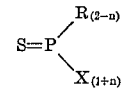

wherein R, which can be the same or different, is hydrocarbyl of not more than 18 carbon atoms bonded to the phosphorous atom through a carbon-phosphorus bond, X is halogen (Cl, Br, F and I) and n is an integer from 0 to 1, and mixtures thereof are prepared by the process which comprises reacting an organic sulfide of the formula $R_2S$ with a phosphorus trihalide of the formula $PX_3$, wherein each R is hydrocarbyl of not more than 18 carbon atoms and X is as defined above, in the liquid phase in the presence of a halide catalyst selected from the group consisting of (a) organic halides of the formula $(R')X_m$ wherein R' is hydrocarbyl of not more than 18 carbon atoms selected from the group consisting of alkyl, alkenyl, alkynyl, cycloalkyl and aralkyl, X is halogen (Cl, Br, I and F) and m is an integer from 1 to 3, (b) inorganic halides of the formula $MeX_v$ wherein Me is selected from the group consisting of metal and $NH_4$, X is halogen (Cl, Br, I and F) and v is the actual valence of Me and is an integer from 1 to 6 and (c) halogens selected from the group consisting of $Cl_2$, $Br_2$ and $I_2$. Mixtures of the above halide catalysts also can be employed in the process of this invention.

Representative organic halide catalysts of the formula $(R')X_m$ which can be used in this invention include by way of example alkyl halides such as methyl chloride, methyl iodide, methyl bromide, methyl fluoride, ethyl chloride, ethyl iodide, ethyl bromide, ethyl fluoride, dichloroethane, n-propyl chloride, n-propyl bromide, isopropyl iodide, n-butyl bromide, sec-butyl iodide, tert-butyl bromide, 1,3,3 - trichlorobutane, 1,3,3 - tribromobutane, pentyl chloride, pentyl bromide, 2,3-dichloropentane, 3,3-dibromopentane, hexyl chloride, hexyl bromide, 2,4-dichlorohexane, 1,3 - dibromohexane, 1,3,4 - trichlorohexane, heptyl chloride, heptyl bromide, heptyl fluoride, 1,3 - dichloroheptane, 1,4,4 - trichloroheptane, 2,4-dichloromethylheptane, octyl chloride, octyl bromide, octyl iodide, 2,4 - dichloromethylhexane, 2,4 - dichlorooctane, 2,4,4 - trichloromethylpentane, 1,3,5 - tribromooctane and the straight and branched chain nonyl, decyl, undecyl, dodecyl, tridecyl, tetradecyl, pentadecyl, hexadecyl, heptadecyl, and octadecyl chlorides, bromides, fluorides and iodides; alkenyl halides such as vinyl chloride, vinyl bromide, allyl chloride, allyl bromide, 3-chloro-n-butylene-1, 3-chloro-n-pentylene-1, 4-chloro-n-hexylene-2, 3,4 - dichloromethyl - n - pentylene - 1, 3 - chloro-n - heptylene - 1, 1,3,3 - trichloro - n - heptylene - 5, 1,3,5-trichloro - n - octylene - 6, 2,3,3 - trichloromethylpentylene-4, and the various homologues and isomers of alkenyl halides having 2 to 18 carbon atoms; alkynyl halides such as propargyl chloride, propargyl bromide, propargyl iodide and the various homologues and isomers of alkynyl halides having 3 to 18 carbon atoms; cycloalkyl halides such as chlorocyclopentane, bromocyclopentane, 2,4 - dichlorocyclopentane, chlorocyclohexane, bromocyclohexane, 2,4 - dichlorocyclohexane, 2,4,5-trichlorocyclohexane, chlorocycloheptane, 2,5 - dichlorocycloheptane, 2,4,5 - tribromocycloheptane, and the like, and aralkyl halides such as benzyl chloride, benzyl bromide, chlorophenylethane, bromophenylethane, 2,4-dichlorophenylethane, 2,4,5 - trichlorophenylethane, 2,4,6 - tribromophenylethane, di(2,4 - dichlorophenyl)-methane and the like. The preferred organic halide catalysts of the formula $(R')X_m$ are those wherein R' is alkyl, alkenyl, alkynyl, cycloalkyl or aralkyl having not more than 8 carbon atoms, X is chloride and m is an integer from 1 to 3.

Representative metallic halide catalysts of the formula $MeX_v$ which can be used in this invention include by way of example the halides of Na, K, Ti, Ba, Al, Sb, As, Be, Bi, Cd, Ce, Co, Cu, Ga, Au, In, Fe, La, Pb, Mn, Hg, Nb, Ni, Os, Re, Se, Ag, Ta, Tl, Sn, Zn, and the like.

Specific examples of suitable inorganic halide catalysts of the formula $MeX_v$ include by way of example and not limitation: $AlBr_3$, $AlCl_3$, $AlF_3$, $SbBr_3$, $SbCl_3$, $SbI_3$, $SbCl_5$, $SbI_3$, $SbI_5$, $AsBr_3$, $AsCl_3$, $NbCl_5$, $NiBr_2$, $NiCl_2$, $NiI_2$, $OsF_6$, $ReCl_3$, $AsFe_3$, $AsI_3$, $BeBr_2$, $BeCl_2$, $BeF_2$, $BeI_2$, $BiBr_3$, $BiCl_3$, $BiBr_3$, $BiI_3$, $CdBr_2$, $ReCl_6$, $SeF_4$, $AgBr$, $AgF$, $AgI$, $TaCl_5$, $CdCl_2$, $CdF_2$, $CdI_2$, $CeCl_3$, $CoBr_2$, $CoCl_2$, $CoI_2$, $CuBr$, $CuBr_2$, $CuCl$, $CuCl_2$, $TaBr_3$, $TlCl_3$, $SnBr_2$, $SnCl_2$, $ZnBr_2$, $ZnCl_2$, $CuI$, $GaBr_3$, $GaCl_3$, $GaI_3$, $AuBr$, $AuBr_3$, $AuCl$, $AuCl_3$, $AuI_3$, $InBr_3$, $InCl_3$, $ZnI_2$, $NaCl$, $NaI$, $NaBr$, $KCl$, $NH_4Cl$, $InI_3$, $FeBr_2$, $FeBr_3$, $FeCl_2$, $FeCl_3$, $FeBr_3$, $FeI_2$, $LaBr_3$, $LaCl_3$, $LaI_3$, $PbBr_2$, $KBr$, $SnCl_4$, $TiCl_4$, $TiBr_4$, $TiI_4$, $NH_4I$, $PbCl_2$, $PbI_2$, $MnBr_3$, $MnCl_2$, $MnI_2$, $HgBr_2$, $HgBrI$, $HgCl_2$, $HgF_2$, $HgI_2$, $NbBr_5$, $ReCl_3$, $TaCl_5$, $ZnCl_2$, $KI$, $BaCl_2$, $NH_4Br$.

The amount of catalyst employed is not critical. The exact amount will vary somewhat depending upon the specific catalyst and the specific organic sulfide reactant. The catalyst is present in a catalytic amount, generally from about 0.0005 mol to about 0.2 mol per mol of organic sulfide reactant. However, greater or lesser amounts can be employed if desired. Preferably, the catalyst is present in an amount of at least about 0.005 mol per mol of organic sulfide reactant.

Representative R hydrocarbon radicals for the compounds of the above formulae prepared by the process of this invention include by way of example alkyl (1 to 18 carbon atoms) such as methyl, ethyl, n-propyl, isopropyl, n-butyl, sec-butyl, isobutyl, tert-butyl, amyl, hexyl, heptyl, octyl, nonyl, decyl, dodecyl, tetradecyl, hexadecyl, octadecyl and the various homologues and isomers of alkyl having from 1 to 18 carbon atoms; alkenyl (2 to 18 carbon atoms) such as vinyl, allyl, n-butenyl-1, n-butenyl-2, n-pentenyl-2, hexenyl-2, 2,3-dimethylbutenyl-2-, n-heptenyl, n-decenyl, n-dodecenyl and the various homologues and isomers of alkenyl having 2 to 18 carbon atoms; alkynyl (3 to 18 carbon atoms) such as propargyl and the various homologues and isomers of alkynyl having from 3 to 18 carbon atoms; cycloalkyl and alkyl substituted cycloalkyl (3 to 18 carbon atoms) such as cyclopentyl, cyclohexyl, mono- and polymethylcyclohexyl, mono- and polyethylcyclohexyl, cycloheptyl and the like, cycloalkenyl and alkyl substituted cycloalkenyl (3 to 18 carbon atoms) such as cyclopentenyl, cyclohexenyl, cycloheptenyl, mono- and polyethylcyclohexenyl and the like; aryl (6 to 18 carbon atoms) such as phenyl, biphenyl, naphthyl, and the like; aralkyl (7 to 18 carbon atoms) such as benzyl, phenylethyl, diphenylmethyl and the like, and alkaryl (7 to 18 carbon atoms) such as tolyl, ethylphenyl, xylyl, butylphenyl, tert-butylphenyl, trimethylphenyl, diethylphenyl, methylpropylethylphenyl and the like.

In carrying out the process of this invention, the organic sulfide is usually reacted with equimolar amounts of phosphorus trihalide although an excess of either reactant can be employed. The reaction is usually carried out at temperatures from about 100° C. to about 350° C. At temperatures above about 350° C. decomposition occurs and the yield of phosphonothioic and phosphinothioic compounds is substantially reduced. Reaction temperatures below about 100° C. can be used if desired, but the reaction time is increased substantially at such lower temperatures. Preferably the reaction is carried out at temperatures above about 150° C. from the standpoint of optimum conversion in reasonable reaction periods.

The reaction can be carried out at subatmospheric, atmospheric or superatmospheric pressure, the pressure not being critical. The exact reaction conditions, i.e. time, temperature and pressure, will depend upon the specific organic sulfide employed. The reaction also can be carried out in the presence of an inert organic medium. Suitable organic media include, for example, xylene, mesitylene, "Decalin," dichlorobenzene, "Tetralin" and chlorinated biphenyls.

The separation of the desired phosphorus compound from the product mixture is readily accomplished by conventional means well known in the art, e.g. fractional distillation under reduced pressure, selective extraction, fractional distillation using a carrier gas, film distillation, elution or any suitable combination of these methods.

The phosphorus compounds prepared by the process of this invention and numerous uses therefor are well known in the art. These compounds are useful as fire retardants and rust inhibitors and as chemical intermediates in the preparation of petroleum additives, agricultural chemicals, organophosphorus polymers and other products of commercial interest. For example, valuable lubricity additives for lubricating oils can be prepared by reacting the phosphorus compounds prepared by the process of this invention with phenol at temperatures from about 80° C. to about 150° C. in the presence of an acid acceptor in accordance with the following equations:

$$RP(S)X_2 + 2C_6H_5OH \rightarrow RP((S)(OC_6H_5)_2 + 2HX$$
$$(R)_2P(S)X + C_6H_5OH \rightarrow (R)_2P(S)OC_6H_5 + HX$$

wherein R and X are as defined above.

The following examples will illustrate the invention. Parts and percent are by weight unless otherwise indicated.

EXAMPLES 1 to 6

In Examples 1 to 6 the following procedure is employed. Equimolar amounts of methyl sulfide and phosphorous trichloride, together with catalyst if one is used, are sealed in a pressure vessel and heated at the temperatures and for the time intervals given in Table 1. At the end of the reaction period, the vessels are cooled and the product mixtures subjected to gas chromatographic analysis. Results and further details are given in Table 1.

TABLE 1

| Ex. | Catalyst | Reaction conditions | | Products [1] | |
|---|---|---|---|---|---|
| | | Temp. | Time | $CH_3P(S)Cl_2$ | $(CH_3)_2P(S)Cl$ |
| 1 | None | 250 | 12 | Trace | Trace |
| 2 | $I_2$ [2] | 245 | 8 | 46.9 | 10.8 |
| 3 | $I_2$ [2] | 260 | 8 | 49.4 | 17.8 |
| 4 | $CH_3I$ [3] | 260 | 8 | 53.6 | 8.0 |
| 5 | None | 275 | 12 | 8.3 | 1.5 |
| 6 | $CH_3I$ [3] | 275 | 12 | 38.6 | 13.0 |

[1] Product expressed as weight percent of product mixture.
[2] Catalyst present at 0.04 mol per mol of methyl sulfide.
[3] Catalyst present at 0.05 mol per mol of methyl sulfide.

EXAMPLES 7 to 25

Equimolar amounts of organic sulfide and the appropriate phosphorus trihalide are heated at 245° C. for 8 hours in the presence of the catalysts listed in Table 2 below following the procedure of Example 2. At the end of this time the product mixtures are each subjected to gas chromatographic analysis. In all examples, amounts of organophosphonothioic dihalide and diorganophosphinothioic halide comparable to those of Example 2 are obtained.

TABLE 2

| Ex. | PX₃ | Organic Sulfide | Catalyst | Amount[1] |
|---|---|---|---|---|
| 7 | PCl₃ | Methyl sulfide | NaCl | 0.1 |
| 8 | PCl₃ | Ethyl sulfide | KBr | 0.025 |
| 9 | PBr₃ | Propyl sulfide | ZnI₂ | 0.01 |
| 10 | PBr₃ | Hexyl sulfide | HgCl₂ | 0.2 |
| 11 | PCl₃ | Allyl sulfide | SnCl₄ | 0.05 |
| 12 | PI₃ | Propargyl sulfide | Butyl bromide | 0.005 |
| 13 | PI₃ | n-Pentenyl-1 sulfide | PbCl₂ | 0.05 |
| 14 | PCl₃ | Dodecyl sulfide | Ethylene dibromide | 0.01 |
| 15 | PCl₃ | Methyl sulfide | TiBr₄ | 0.05 |
| 16 | PBr₃ | ----do---- | KI | 0.0005 |
| 17 | PBr₃ | ----do---- | NH₄Br | 0.001 |
| 18 | PCl₃ | Phenyl sulfide | 1,3,5-tri-iodopentane | 0.002 |
| 19 | PI₃ | Cyclohexyl sulfide | Propargyl bromide | 0.001 |
| 20 | PI₃ | 1-cyclohexenyl sulfide | Allyl chloride | 0.005 |
| 21 | PI₃ | Benzyl sulfide | Benzyl chloride | 0.006 |
| 22 | PBr₃ | Methyl sulfide | 1-bromo-3-iodocyclohexane | 0.001 |
| 23 | PCl₃ | Tolyl sulfide | 2,2-dichlorodecane | 0.007 |
| 24 | PCl₃ | Methyl sulfide | 3-chloromethyl-n-pentylene-1. | 0.0009 |
| 25 | PCl₃ | Cycloheptyl sulfide | 2-chloro-cycloheptane | 0.003 |

[1] Mols of catalyst per mol of organic sulfide reactant.

The embodiments of the invention in which an exclusive property or privilege is claimed are defined as follows:

1. Process for the preparation of phosphorus compounds selected from the group consisting of compounds of the formula

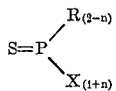

wherein R is hydrocarbyl having not more than 18 carbon atoms selected from the group consisting of alkyl, alkenyl, alkynyl, cycloalkyl, cycloalkynyl, aryl, alkaryl and aralkyl; X is selected from the group consisting of Cl, Br, F, and I; and $n$ is an integer from 0 to 1, and mixtures thereof which comprises reacting in the liquid phase an organic sulfide of the formula R₂S with a phosphorus trihalide of the formula PX₃ at a temperature from about 100° C. to about 350° C., wherein R and X are as defined above, in the presence of a halide catalyst selected from the group consisting of (a) organic halides of the formula (R')+Xₘ wherein R' is hydrocarbyl of not more than 18 carbon atoms selected from the group consisting of alkyl, alkenyl, alkynyl, cycloalkyl and aralkyl X is halogen and $m$ is an integer from 1 to 3, (b) inorganic halides of the formula MeXᵥ wherein Me is selected from the group consisting of Na, K, Ti, Ba, Al, Sb, As, Be, Bi, Cd, Ce, Co, Cu, Ga, Au, In, Fe, La, Pb, Mn, Hg, Nb, Ni, Os, Re, Se, Ag, Ta, Tl, Sn, Zn and NH₄, X is halogen and $v$ is the actual valence of Me and is an integer from 1 to 6 and (c) halogens selected from the group consisting of I₂, Br₂ and Cl₂.

2. Process of claim 1 wherein the temperature is above about 150° C.

3. Process of claim 1 wherein the organic sulfide is an alkyl sulfide.

4. Process of claim 1 wherein the organic sulfide is aryl sulfide.

5. Process of claim 1 wherein the phosphorous trihalide is phosphorus trichloride.

6. Process of claim 3 wherein the alkyl sulfide is methyl sulfide.

7. Process of claim 4 wherein the aryl sulfide is phenyl sulfide.

8. Process of claim 1 wherein the halide catalyst is an organic halide.

9. Process of claim 1 wherein the halide catalyst is an inorganic halide catalyst.

10. Process of claim 8 wherein the organic halide catalyst is methyl iodide.

11. Process of claim 1 wherein the organic sulfide is methyl sulfide, the phosphorus trihalide is phosphorus trichloride and the halide catalyst is methyl iodide.

12. Process of claim 1 wherein the organic sulfide is methyl sulfide, the phosphorus trihalide is phosphorus trichloride and the halide catalyst is I₂.

References Cited
UNITED STATES PATENTS 2,662,917  12/1953  Jensen.
2,685,603   8/1954  Walsh.
2,882,304   4/1959  Weber.

BERNARD HELFIN, Primary Examiner

J. E. EVANS, Assistant Examiner

U.S. Cl. X.R.

46—6; 260—961, 973